United States Patent [19]

Prentice

[11] 4,010,963
[45] Mar. 8, 1977

[54] SKIRT FOR MOBILE HOMES

[76] Inventor: John E. Prentice, 1212 N. 950 West, Orem, Utah 84057

[22] Filed: Feb. 10, 1975

[21] Appl. No.: 548,850

[52] U.S. Cl. ............................. 280/768; 52/DIG. 3; 52/169.12
[51] Int. Cl.² ......................................... B60R 27/00
[58] Field of Search ................. 296/23 R, 23 C, 26; 280/150 R, 768; 52/DIG. 3, 169

[56] References Cited

UNITED STATES PATENTS

| | | | |
|---|---|---|---|
| 2,988,380 | 6/1961 | Puckett et al. ................ 280/150 R |
| 3,694,979 | 10/1972 | Vadnie ........................ 52/DIG. 3 X |
| 3,710,525 | 6/1973 | Lopes ........................ 52/DIG. 3 X |
| 3,785,675 | 1/1974 | Norris ........................ 52/DIG. 3 X |
| 3,803,781 | 4/1974 | Struben ...................... 52/DIG. 3 X |
| 3,832,813 | 9/1974 | Hindman ..................... 52/DIG. 3 X |

*Primary Examiner*—Robert J. Spar
*Assistant Examiner*—Donald W. Underwood
*Attorney, Agent, or Firm*—Lynn G. Foster

[57] ABSTRACT

A skirt for mobile homes and the like, the skirt comprising substantially rigid sheet material, preferably cold rolled or cold bent sheet aluminum and comprises a top panel consisting of three separate sheets held together by a bridge across the top which top bridge is anchored by fasteners to each of the top sheets. The skirt also comprises a bottom panel consisting of at least three separate bottom sheets anchored together by a bottom bridge using fasteners. The top and bottom panels taken as a whole comprise three U-shaped telescopically related top to bottom segments which are vertically slidably interlocked one segment with the next so that the top panel and the bottom panel may be relatively telescopically displaced thereby changing the overall vertical effective length (height) of the skirt. By anchoring the skirt in depending relation at the periphery adjacent the floor of a mobile home, the skirt is caused to span the distance between the bottom of the mobile home and the ground. By using a plurality of said skirts in edge-to-edge relationship, the entire periphery between the ground and the mobile home may be so enclosed. Thus, the adverse effects of cold weather and wind across and at the bottom of the mobile home is minimized and the aesthetics of the mobile home improved.

2 Claims, 5 Drawing Figures

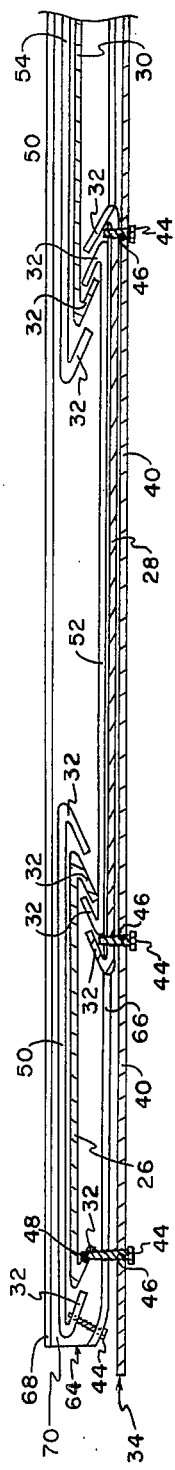
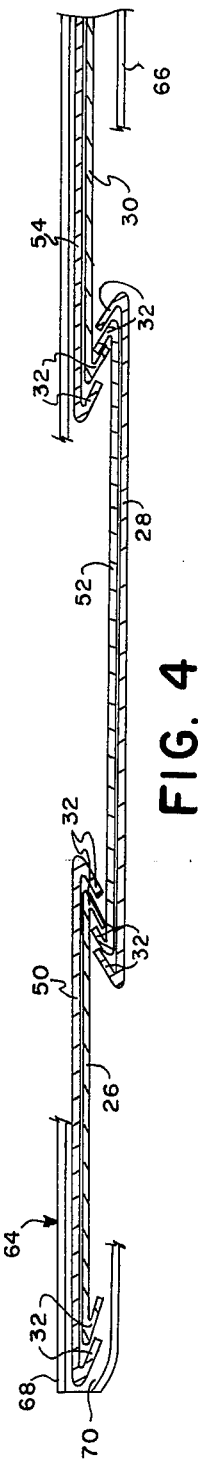
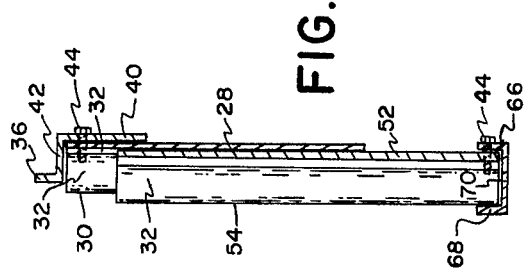

SKIRT FOR MOBILE HOMES

BACKGROUND

Field of Invention

The present invention relates generally to skirts adapted to be attached to the bottom periphery of mobile homes and span between the floor of the mobile home and the ground and more particularly to such skirts having a telescopic vertical adjustment capability so that variations in said floor-to-ground distance may be readily accommodated.

Prior Art

The prior art has consisted largely of awkward systems for essentially enclosing at the periphery the space between the floor of a mobile home and the ground (on occasions when the mobile home is parked at one location for a substantial interval of time). Such prior efforts have consisted of either economically prohibitive complex mechanisms or have required that new panels be especially cut and tailored each time a mobile home is moved, such panels, for the most part being discarded when the mobile home is moved to a subsequent location.

BRIEF SUMMARY AND OBJECTS OF THE PRESENT INVENTION

The present invention comprises a novel skirt for mobile homes which is telescopically expandable to fill the gap between the floor of a mobile home and the ground along the periphery of the mobile home independent of variations in the distance between said floor and the ground and comprises top and bottom panels which are slidably interrelated such that the skirt in a vertically collapsed condition is attached to the mobile home at its periphery adjacent the floor thereof at or near the top edge of the top panel of the skirt and the skirt is telescopically expanded until the bottom edge, which comprises a bottom panel of the skirt, is contiguous with the ground, said skirt being economically fabricated from relatively thin sheet material.

With the foregoing in mind, it is a primary object of the present invention to provide a novel skirt for mobile homes and the like.

It is a further paramount object of the present invention to provide an efficient and economical skirt for mobile homes and the like which is suspended from the mobile home adjacent its floor at the periphery thereof and is telescopically expandable to bridge the distance between said floor and the ground at the mentioned peripheral location.

It is a further important object of the present invention to provide a novelly configurated skirt for mobile homes and the like which accommodates low cost fabrication, easy installation, effective enclosure of the area between the ground and the floor of a mobile home and which accommodates repeated use as the mobile home is relocated from time to time.

These and other objects and features of the present invention will be apparent from the following detailed description, taken with reference to the accompanying drawings.

BRIEF DESCRIPTION OF THE DRAWINGS

FIG. 3 is a cross section taken along lines 3—3 of FIG. 2;

FIG. 4 is a cross section taken along lines 4—4 of FIG. 2 with parts broken away and fasteners removed for purposes of clarity; and FIG. 5 is a cross section taken along lines 5—5 of FIG. 2.

DETAILED DESCRIPTION OF THE ILLUSTRATED EMBODIMENT

Figure 1:
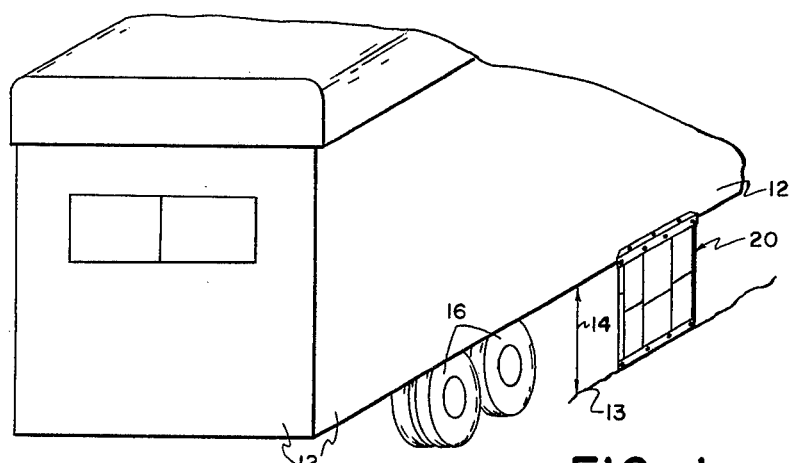
FIG. 1 is a fragmentary perspective representation of a mobile home showing one skirt according to the present invention installed thereon.

Specific reference is now made to the drawings wherein like numerals are used to designate like parts throughout. FIG. 1 in fragmentary perspective illustrates a mobile home, generally designated 10, which, at its external floor location, defines a periphery 12. Because of the requirement that the mobile home be supported upon a suspension system comprising wheels 16, inherently, when the mobile home is located at a given site, there exists a space 14 between the floor periphery 12 and the ground line 13 (which may be soil, a concrete or like pad, etc.). This space is objectionable to most mobile homeowners and users not only because it is unsightly but because elements of the weather (rain, wind, snow, etc.) more adversely effect the interior of the mobile home 10 when allowed to infiltrate without restriction the space between the trailer floor and the ground.

The present invention proposes enclosing said space using a plurality of skirts, generally designated 20. As best shown in FIGS. 2-5, the skirt 20 comprises a top panel, generally designated 22 and a bottom panel, generally designated 24. The top and bottom panels 22 and 24, respectively are telescopically related in a manner more fully hereinafter described to accommodate repeated use of the panel because the vertical height thereof may be adjusted up or down by relatively telescopically displacing the top and bottom panels 22 and 24. Compare the solid with the dotted line representations in FIG. 2.

The top panel 22 comprises three generally U-shaped top sheets 26, 28 and 30, preferably formed of cold rolled or bent sheet aluminum of relatively thin gauge. The preferred U configuration is best illustrated in FIGS. 3 and 4 showing the flanges (32 forming the legs of the U) as defining an included acute angle substantially less than 90° in respect to the remainder of said sheets 26, 28 and 30. The mentioned flange configuration contributes to the relatively low cost of the skirt 20 and accommodates ready and effective telescopic adjustment in the effective height of the skirt.

Figure 2:
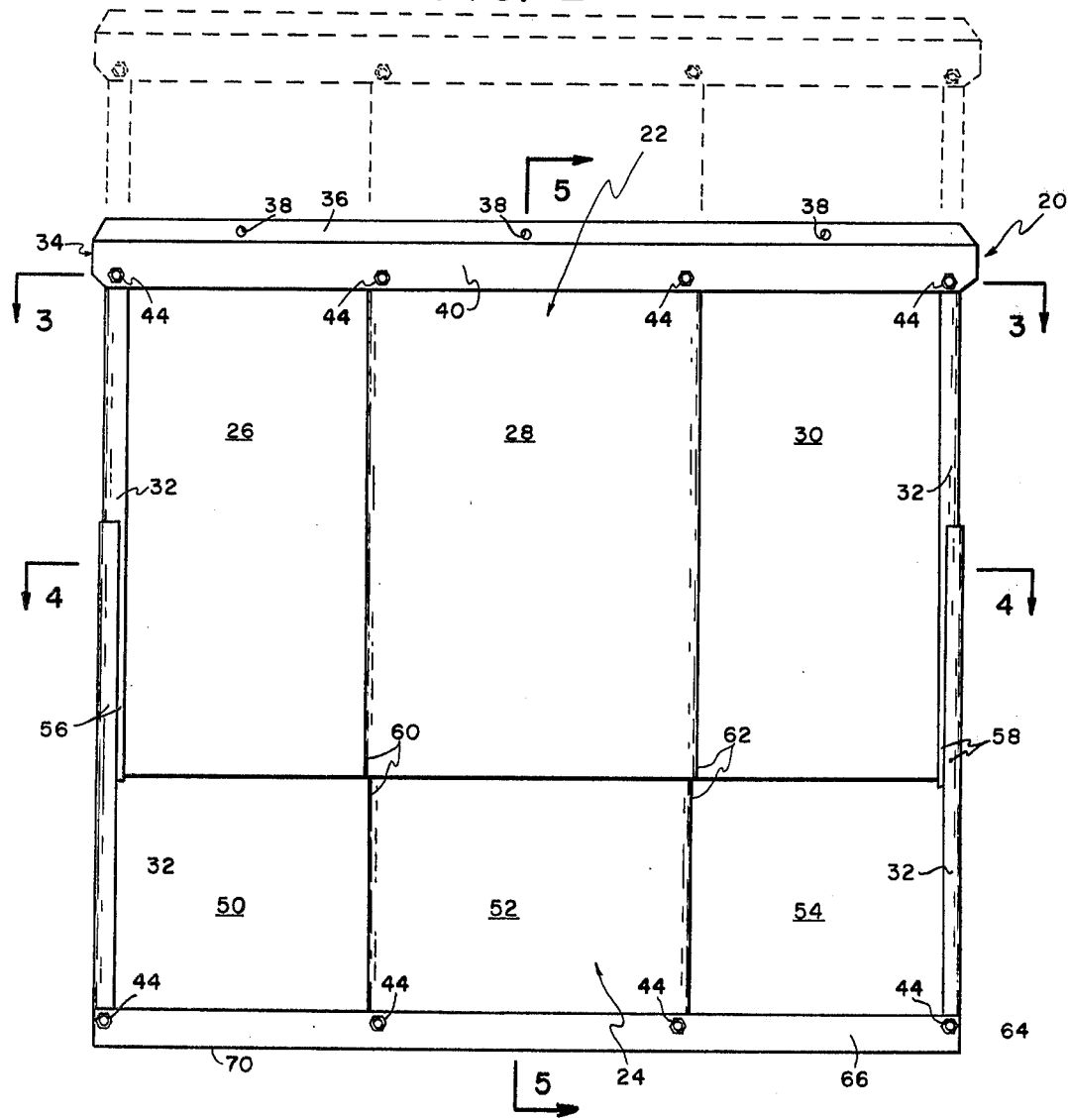
FIG. 2 is a front elevational view of the skirt shown in FIG. 1, with phantom lines showing the manner in which the skirt may be expanded to vary the overall height thereof.

As best illustrated in FIG. 2, the three U-shaped sheets 26, 28 and 30 comprising top panel 22 are rigidly connected together so as to function as a unit by a top bridge beam 34. The bridge beam 34 comprises an upwardly extending flange 36 which may be solid or may comprise spaced apertures 38. In any event, the flange 36 is intended to be placed contiguous with the floor periphery 12 of the mobile home 10 and there anchored by suitable fasteners, as illustrated in FIG. 1.

The top bridge beam 34 also comprises a downwardly extending flange 40 connected to the flange 36 by an offset portion 42. The outside two cap screws 44 are placed through undersized apertures 46 (in the flange 40) and 48 (in the outside flange 32 of the sheet 26 and the outside flange 32 of the sheet 30, each said flange comprising part of a reverse curve). The inside two cap screws 44 are each threaded through an undersized aperture 46 (in the flange 40) and an undersized aperture (in the base of the U of sheet 28 near the flanges 32). Thus, when force is exerted to telescopically vertically adjust the height of the top panel 22 (comprising sheets 26, 28 and 30) in respect to bottom panel 24, as for example by gripping the top bridge beam 34, the sheets 26, 28 and 30 are displaced as a unit.

The bottom panel 24 also comprises three generally U-shaped sheets 50, 52 and 54, each being configurated into substantially the same shape as previously described sheets 26, 28 and 30 except sheets 50 and 54 have a slightly longer base than sheets 26 and 30 while sheet 52 has a slightly shorter base than sheet 28 accommodating the telescopic relationship illustrated best in FIGS. 3 and 4 wherein top and bottom panels 26 and 50, top and bottom panels 28 and 52 and top and bottom panels 30 and 54 are contiguously partially vertically superimposed one within the U-shaped interior of the other in alignment therewith. The respective flanges 32 of the various sheets comprise lips or slide tracks for the mentioned telescopic adjustment in the overall height of the skirt. These slide tracks are located not only at each edge 56 and 58 but also at two interior locations 60 and 62. It is apparent from FIGS. 3 and 4 that the vertically slidable interlocking tracks at locations 60 and 62 comprise four of the flanges 32 such that the flanges 32 and the base of the sheet 28 slide essentially contiguously with and relative to flanges 32 and the base of the sheet 52 while the flange 32 at location 60 of the sheet 26 slides essentially contiguously relative to the flanges 32 at the same locations of both panels 50 and 52. The same is true of flange 32 of panel 30 at location 62.

The sheets 50, 52 and 54 are connected together rigidly for unitary telescopic displacement in a manner mentioned previously by a bottom bridge beam 64, which is adapted to engage the ground when placed upon a mobile home as illustrated in FIG. 1. The bridge 64 is essentially a channel comprising a pair of upwardly directed flanges 66 and 68 connected by a base 70. When installed nails or other fasteners may be placed through the base 70 into the ground to insure stability. The bottom bridge beam 64, like the top bridge beam 34 spans across the entire width of the skirt and is connected to the three bottom sheets 50, 52 and 54 at or near the flanges 32 thereof using cap screws 44 and undersized apertures in the manner described previously. Thus, the bottom bridge beam 64 unites the bottom sheets 50, 52 and 54 as the top bridge beam 34 unites the top sheets 26, 28 and 30 and the mentioned vertical telescopic displacement (accommodated at slidable track interfaces 56, 58, 60 and 62) is thereby permitted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A skirt section for mobile homes and the like of substantially rigid sheet material, the skirt section comprising:
   top panel means spanning between the side limits of the skirt section and defining at least two vertically extending lip means;
   bottom panel means at least partially vertically overlapping the top panel means and spanning between the side limits of the skirt section, the bottom panel means comprising at least two lip means respectively contiguous with the lip means of the top panel means;
   the respective pairs of contiguous lip means defining a track whereby the vertical span of the skirt section may be selectively adjusted and alignment preserved by relatively displacing the top panel means in respect to the bottom panel means along said track;
   means for mounting the top edge of the top panel in suspended relation to a mobile home or the like;
   each panel means comprising three separate pieces in series, the two end pieces in a common plane and the third in a second plane offset from but essentially parallel to the first plane and said mounting means comprising a bridge physically tying said three separate pieces of the top panel means together for unitary displacement and an additional bridge physically tying said three separate pieces of said bottom panel means together for unitary displacement.

2. A skirt section for mobile homes and the like, the skirt comprising:
   at least three pairs of generally U-shaped telescopically related loosely partially vertically superimposed top and bottom sheets, each pair of sheets being vertically slidably interlocking with at least one other of said pairs of sheets, the vertically slidable interlocking feature between pairs of sheets comprising flange extending from the edge of each sheet and defining one leg of an included acute angle substantially less than 90° the remainder of each sheet comprising the other leg of said acute angle, two of the flanges of each pair of sheets projecting essentially in one direction and two in the opposite direction each two being loosely contiguously superimposed in said telescopic relation;
   top bridge means rigidly connected to the top sheet of each of said pairs of sheets to secure said top sheets together so that said top sheets are manually relatively vertically displaced as a unit, said top bridge means comprising means for attaching the top bridge means to a mobile home or the like so that the skirt section is suspended at the periphery of the mobile home into the space between the ground and the floor of the mobile home;
   bottom bridge means rigidly connected to the bottom sheet of said pairs of sheets to secure said bottom sheets together so that said bottom sheets are manually relatively vertically displaced as a unit in respect to the top sheets, to allow the bottom bridge means to engage the ground upon manual telescopic adjustment of the vertical height for the skirt and the skirt section to thereby span the full distance between the ground and the floor of the mobile home at said periphery.

* * * * *